United States Patent
Norkin

(10) Patent No.: US 10,080,005 B2
(45) Date of Patent: Sep. 18, 2018

(54) HIGH DYNAMIC RANGE COLOR CONVERSION CORRECTION

(71) Applicant: NETFLIX, Inc., Los Gatos, CA (US)

(72) Inventor: Andrey Norkin, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/179,857

(22) Filed: Jun. 10, 2016

(65) Prior Publication Data

US 2017/0134703 A1 May 11, 2017

Related U.S. Application Data

(60) Provisional application No. 62/253,098, filed on Nov. 9, 2015, provisional application No. 62/256,080, filed on Nov. 16, 2015.

(51) Int. Cl.

| | | |
|---|---|---|
| *H04N 9/64* | (2006.01) | |
| *H04N 19/186* | (2014.01) | |
| *H04N 19/10* | (2014.01) | |
| *H04N 19/86* | (2014.01) | |
| *H04N 19/132* | (2014.01) | |
| *H04N 19/85* | (2014.01) | |

(52) U.S. Cl.
CPC ............ *H04N 9/646* (2013.01); *H04N 19/10* (2014.11); *H04N 19/132* (2014.11); *H04N 19/186* (2014.11); *H04N 19/85* (2014.11); *H04N 19/86* (2014.11)

(58) Field of Classification Search
None
See application file for complete search history.

(56) References Cited

U.S. PATENT DOCUMENTS

| | | | | |
|---|---|---|---|---|
| 7,843,465 | B1* | 11/2010 | Shaick | G09G 5/02 345/427 |
| 2015/0271509 | A1* | 9/2015 | Minoo | H04N 19/33 375/240.29 |
| 2016/0269733 | A1* | 9/2016 | Tourapis | H04N 9/64 |
| 2016/0360215 | A1* | 12/2016 | Rusanovskyy | H04N 19/1887 |
| 2017/0118489 | A1* | 4/2017 | Berbecel | H04N 19/593 |

FOREIGN PATENT DOCUMENTS

EP  2 365 472 A2  9/2011

OTHER PUBLICATIONS

Sullivan, "Report of Question 6/16 Visual coding", TD 215 R1 (WP3/16, ITU-T Draft; Study Period 2013-2016, International Telecommunication Union, Geneva; CH, Microsoft Corp. USA, vol. 1/16, Oct. 23, 2015, 24 pages.

(Continued)

*Primary Examiner* — Edward Martello
(74) *Attorney, Agent, or Firm* — Artegis Law Group, LLP

(57) ABSTRACT

One embodiment of the present invention sets forth a technique for correcting color values. The technique includes downsampling first color space values to generate downsampled color space values and upsampling the downsampled color space values to generate second color space values. The technique further includes modifying at least one component value included in the downsampled color space values based on a first component value included in the first color space values, a second component value included in the second color space values, and an approximation of a nonlinear transfer function.

21 Claims, 6 Drawing Sheets

(56) References Cited

OTHER PUBLICATIONS

Call for Evidence (CfE) for HDR and WCG Video Coding ISO/IEC (MPEG) http://mpeg.chiariglione.org/standards/exploration/high-dynamic-range-and-wide-colour-gamut-content-distribution/call-evidence.
Recommendation ITU-R BT.709 : "Parameter values for the HDTV standards for production and international programme exchange".
Recommendation ITU-R BT.1886 : "Reference electro-optical transfer function for flat panel displays used in HDTV studio production".
International Search Report and Written Opinion for PCT/US2016/061190 dated Feb. 24, 2017.
Sullivan, "Report of Question 6/16 Visual coding", TD 215 R1 (WP3/16), ITU-T Draft; Study Period 2013-2016, International Telecommunication Union, Geneva; CH, Microsoft Corp. USA, vol. 1/16, Oct. 23, 2015, 24 pages.
Strom, et al., "Ericsson's Response to CFE for HDR and WCG", 112, MPEG Meeting; Jun. 22, 2015; Warsaw; Motion Picture Expert Group or ISO/IEC JTC1/SC29/WG11), 11 pages.
Non-Final Office Action for U.S. Appl. No. 15/179,857, dated Sep. 5, 2017.
Call for Evidence {CfE) for HDR and WCG Video Coding ISO/IEC (MPEG) http://mpeg.chiariglione.org/standards/exploration/high-dynamic-range-and-wide-colour-gamut-content-distribution/call-evidence.
Recommendation ITU-R BT.709: "Parameter values for the HDTV standards for production and international programme exchange".
Recommendation ITU-R BT. 1886 : "Reference electro-optical transfer function for flat panel displays used in HDTV studio production".
DECE, "Common File Format & Media Formats Specification version 2.1", Digital Entertainment Content Ecosystem (DECE), http://www.uvcentral.com/sites/default/files/files/PublicSpecs/CFFMediaFormat-2_1.pdf.
Recommendation ITU-R BT.2020: "Parameter values for ultra-high definition television systems for production and international programme exchange", http://www.itu.int/rec/R-REC-BT.2020/en.
SMPTE ST 2084: "High Dynamic Range Electro-Optical Transfer Function of Mastering Reference Displays", http://standards.smpte.org/content/978-1-61482-829-7/st-2084-2014/SEC1.
Jacob Strom, Martin Pettersson, Jonatan Samuelsson, Kenneth Andersson, "Additional Results for m36184 for Color Correction", ISO/IEC (MPEG) document m36184, Warsaw, Poland, Jun. 2015.
A. Norkin, "Closed form HDR 4:2:0 chroma subsampling (HDR CE1 and AHG5 related)", ITU-T SG16 WP3 and ISO/IEC JTC1/SC29/WG11 document JCTVC-W0107, San Diego, CA, USA, Feb. 2016.
A. Norkin, "On closed form HDR 4:2:0 chroma subsampling (AHG13 related)", ITU-T SG16 WP3 and ISO/IEC JTC1/SC29/WG11 document JCTVC-X0072, Geneva, Switzerland, May 2016.
J. Ström, J. Samuelsson, K. Andersson, P. Hermansson, "Modified Linearization of Luma Adjustment", ITU-T SG16 WP3 and ISO/IEC JTC1/SC29/WG11 document JCTVC-X0036, Geneva, Switzerland, May 2016.
François et al., "About using a BT.2020 Container for BT.709 Content", ISO/IEC JTC1/SC29/WG11 MPEG2013/M35255, Oct. 2014, Strasbourg, France, 15 pages.
Stessen et al., "Chromaticity Based Color Signals for Wide Color Gamut and High Dynamic Range", ISO/IEC JTC1/SC29/WG11 MPEG2014/M35065, Oct. 2014, Strasbourg, France, 55 pages.
Storm, Jacob, "Investigation of HDR Color Subsampling", ISO/IEC JTC1/SC29/WG11 MPEG2014/M35841, Feb. 2015, Geneva, Switzerland, 24 pages.
Tourapis, Alexis M., "HDRTools", retrieved from https://gitlab.com/standards/HDRTools, retrieved on Apr. 12, 2018, 2 pages.

\* cited by examiner

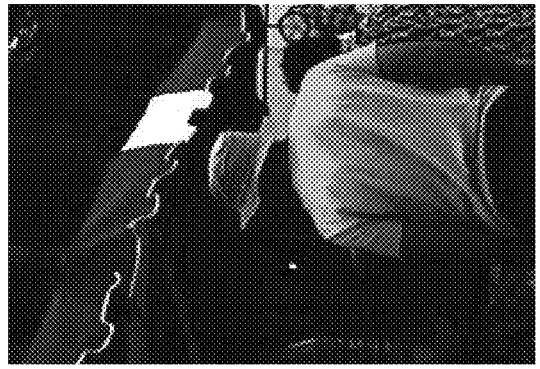
FIG. 5C (Linear Approximation of EOTF)
FIG. 5B (Direct Subsampling)
FIG. 5A (Original)

HIGH DYNAMIC RANGE COLOR CONVERSION CORRECTION

CROSS-REFERENCE TO RELATED APPLICATIONS

This application claims benefit of both the United States provisional patent application having Ser. No. 62/253,098, filed Nov. 9, 2015, and the United States provisional patent application having Ser. No. 62/256,080, filed Nov. 16, 2015. The subject matter of these related applications is hereby incorporated herein by reference.

BACKGROUND OF THE INVENTION

Field of the Invention

Embodiments of the present invention relate generally to audiovisual processing and, more particularly, to high dynamic range (HDR) color conversion correction.

Description of the Related Art

High Dynamic Range (HDR) imaging is a technique that enables a wider range of luminance values to be represented than is typically possible via conventional imaging techniques. In particular, conventional imaging equipment is capable of capturing and reproducing only a limited luminance range, commonly resulting in a loss of detail in the luminance ranges associated with shadows and/or highlights. By contrast, HDR techniques are capable of capturing and representing a luminance range that is closer to the range perceived by the human visual system. Consequently, HDR techniques are expected to significantly improve the visual quality of many types of multimedia content.

In order to represent the luminance values associated with HDR content (e.g., luminance values of approximately 0 to 10,000 $cd/m^2$) using moderate bit depths (e.g., 10 to 12 bits per sample), various standards apply a highly nonlinear transfer function to the HDR content. Bit depth generally refers to the number of bits used to represent one image component sample (e.g. a luma or chroma value). More specifically, because the human visual system is more sensitive to differences in luminance values when the luminance values are low, a nonlinear transfer function is commonly applied to linear color values (e.g., RGB values) associated with HDR content in order to allocate a greater number of values to the lower end of the luminance range. Allocating more values to the lower end of the luminance range allows quantization to be achieved at moderate bit depths without any perceptible artifacts from the perspective of the viewer.

After a nonlinear transfer function is applied to HDR content, the resulting nonlinear values are converted to a desired color space and further processed so that the HDR content can be transmitted and broadcast more efficiently. Those additional processing operations typically include chroma subsampling and video compression, each of which are performed to reduce the bitrate of the HDR content. For example, with respect to the HDR10 specification recently adopted by the Digital Entertainment Content Ecosystems (DECE), a ST.2084 nonlinear transfer function is applied to linear RGB values. The nonlinear R'G'B' values are then converted into the BT.2020 color space, and the resulting Y'CbCr 4:4:4 values are subsampled to generate Y'CbCr 4:2:0 values. The Y'CbCr 4:2:0 values are then compressed via High Efficiency Video Coding (HEVC) Main10 encoding to generate a compressed video stream.

One drawback of conventional HDR conversion processes is that, when color values (e.g., Y'CbCr 4:4:4 values) associated with HDR content are subsampled, the chroma values are subsampled by a process similar to averaging, for example by applying a low-pass filter and subsequently decimating samples (e.g., to generate Y'CbCr 4:2:2 values or Y'CbCr 4:2:0 values), but the luma values are not. When the HDR content is reconstructed, the averaged chroma values are upsampled and then combined with the original luma values. Thus, because the chroma values were modified in the first instance, when an inverse of the nonlinear transfer function is applied to the upsampled values, the reconstructed color values may be significantly different than the color values present in the original HDR content. These types of differences are most noticeable with color values that fall within regions of the nonlinear opto-electrical transfer function that have a steep slope (e.g., color components with low luminance values), since, in these regions, small variations in the value of a color component can have a significant impact on Y', Cb, and Cr values.

For example, if one color component has a value close to zero, while other color components have higher values—which is commonly the case for colors that are close to color gamut boundaries—then the low intensity color component value would have disproportionally high contribution to the resulting Y'CbCr 4:4:4 signal. That is, small variations in this low intensity color component value would result in significantly different values for the Y', Cb, and Cr components, despite the corresponding linear RGB values being similar. Consequently, when Y'CbCr 4:2:0 color values are later upsampled to Y'CbCr 4:4:4 color values and the inverse nonlinear transfer function is applied, changes in the Cb and/or Cr values due to subsampling may cause saturated colors to be reconstructed to significantly different values, producing artifacts in the final image.

One solution to the above problem is to iterate over different luma values to select a luma value that, when reconstructed (e.g., by upsampling Y'CbCr 4:2:0 color values to Y'CbCr 4:4:4 color values) results in a linear luminance that is closest to the linear luminance of the original signal. However, in order to select a luma value for a 10-bit signal, for example, this particular approach would require ten iterations to be performed for each luma sample. Because a single iteration requires an inverse nonlinear transfer function to be calculated and an inverse color transform to be applied, these types of conventional techniques can be very slow, even when the electro-optical transfer function is implemented as a look-up table.

As the foregoing illustrates, improved techniques for converting and correcting high dynamic range (HDR) color values would be useful.

SUMMARY OF THE INVENTION

One embodiment of the present invention sets forth a method for correcting color values. The method includes downsampling first color space values to generate downsampled color space values and upsampling the downsampled color space values to generate second color space values. The method further includes modifying at least one component value included in the downsampled color space values based on a first component value included in the first color space values, a second component value included in the second color space values, and an approximation of a nonlinear transfer function Further embodiments provide, among other things, a non-transitory computer-readable medium and a computing device configured to implement the method set forth above.

At least one advantage of the disclosed techniques is that the resulting reconstructed HDR images are more accurate relative to the original HDR images than images generated via conventional chroma downsampling. Additionally, the complexity of the disclosed techniques is significantly lower than that of the conventional approaches, enabling an optimal component value (e.g., a luma value) to be determined in real-time via a single iteration.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A and 5A are original HDR images, FIGS. 4B and 5B are images processed according to conventional techniques, and FIGS. 4C and 5C are images processed according to one or more embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
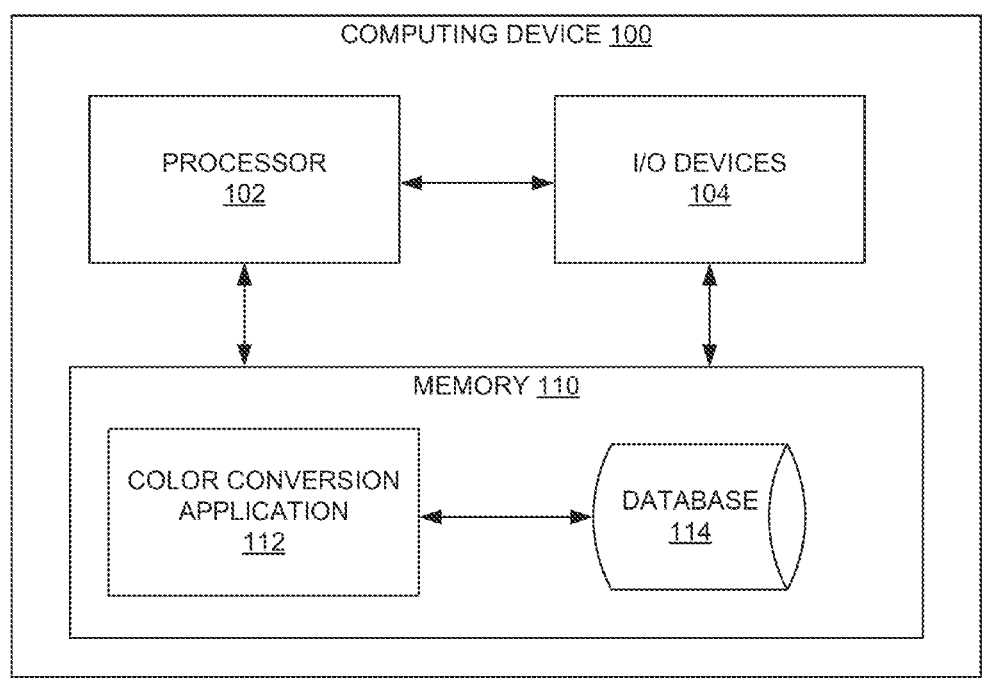
FIG. 1 is a conceptual illustration of a computing device configured to implement one or more aspects of the present invention.

FIG. 1 is a conceptual illustration of a computing device 100 configured to implement one or more aspects of the present invention. As shown, the color conversion system includes a computing device 100. The computing device 100 includes a processor 102, input/output (I/O) devices 104, and a memory 110. The memory 110 includes a color conversion application 112 configured to interact with a database 114.

The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. The color conversion application 112 within memory 110 is executed by the processor 102 to implement the overall functionality of the color conversion system. For example, and without limitation, multimedia content (e.g., images, video, etc.) received by the color conversion system may be processed by the color conversion application 112 to apply linear and/or nonlinear transfer functions to the multimedia content, to convert the multimedia content between one or more color spaces, to perform downsampling, subsampling, upsampling, etc. on the multimedia content, and/or to apply one or more compression algorithms to the multimedia content. Database 114 within memory 110 may store images, video, algorithms, parameters, lookup tables, and/or other types of data associated with transfer functions, color spaces, lossy and/or lossless codecs, etc.

I/O devices 104 may include input devices, output devices, and devices capable of both receiving input and providing output. For example, and without limitation, I/O devices 104 could include wired and/or wireless communication devices that send data to and/or receive data from a camera, a display screen, a media player, a storage device, speakers, a microphone, a networking device, and/or another computing device.

Generally, computing device 100 is configured to coordinate the overall operation of the color conversion system. In other embodiments, the computing device 100 may be coupled to, but separate from other components of the color conversion system. However, the embodiments disclosed herein contemplate any technically feasible system configured to implement the functionality of the color conversion system.

Figure 2:
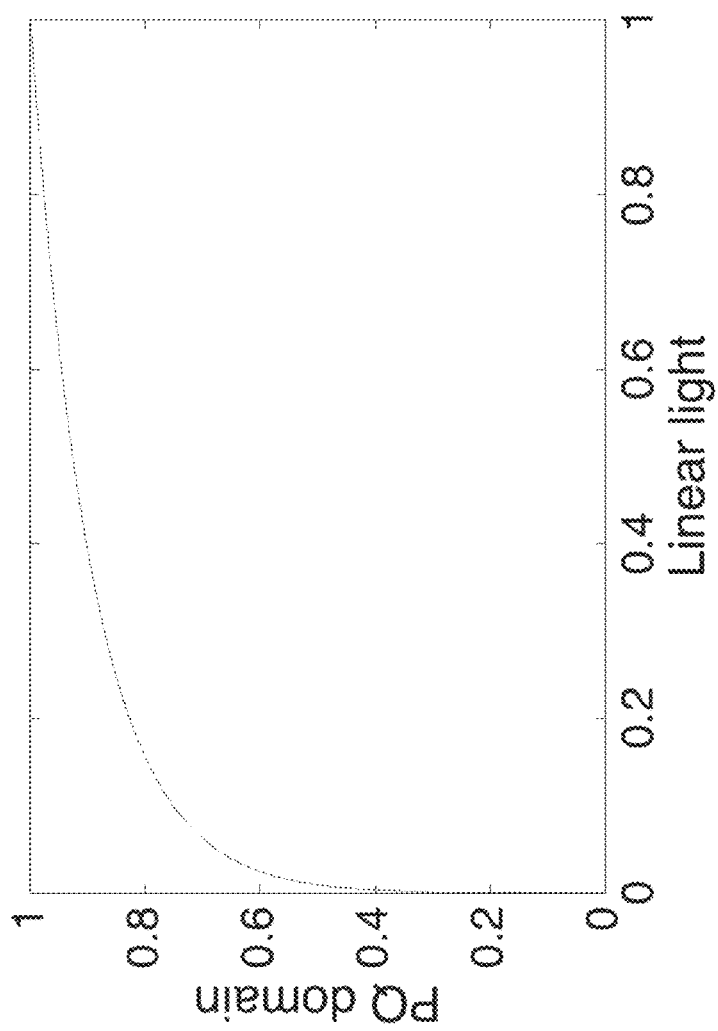
FIG. 2 illustrates a nonlinear opto-electrical transfer function (OETF) that can be implemented to convert linear light/color values to nonlinear light/color values, according to various embodiments of the present invention.

FIG. 2 illustrates a nonlinear opto-electrical transfer function (OETF) that can be implemented to convert linear light/color values to nonlinear light/color values, according to various embodiments of the present invention. As shown, the slope of the transfer function is steep in the low-luminance range and shallow in the high luminance range, since the human visual system is more sensitive to differences in luminance values when the luminance values are low. As a result, the nonlinear transfer function allocates more codewords and uses smaller quantization steps in the low luminance range, reducing the likelihood that quantization will produce visible artifacts in an image. Although the techniques disclosed herein are described in conjunction with the OETF shown in FIG. 2, in various embodiments, any other type of nonlinear transfer function having any shape may be implemented to convert and reconstruct linear color values.

Figure 3:
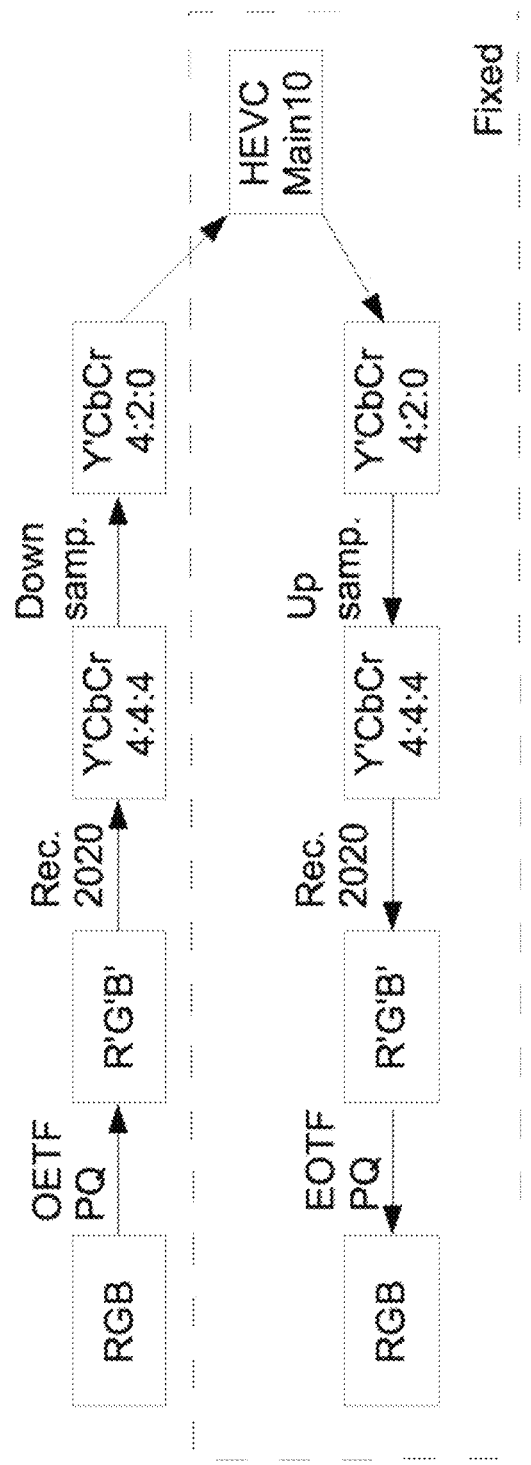
FIG. 3 illustrates a process for converting, compressing, and reconstructing high dynamic range (HDR) content, according to various embodiments of the present invention.

FIG. 3 illustrates a process for converting, compressing, and reconstructing HDR content, according to various embodiments of the present invention. As shown, a nonlinear transfer function is applied to the linear RGB values to generate nonlinear R'G'B' values. The nonlinear R'G'B' values are then converted to a desired color space, and the resulting color values are processed so that the HDR content can be transmitted and broadcast more efficiently.

For example, in some embodiments, nonlinear R'G'B' values are generated by applying the OETF perceptual quantizer (PQ) to each linear light R, G, and B component separately. Then, the nonlinear R'G'B' values are converted to the non-constant luminance BT.2020 color space according to Equation 1, shown below. Next, further processing may be performed on the Y'CbCr 4:4:4 color values, for example, to reduce the bitrate for ease of transmission.

$$Y'=0.2627R'+0.6780G'+0.0593B';$$

$$Cb=(B'-Y)/1.8814; Cr=(R'-Y)/1.4746; \quad (1)$$

In some embodiments, after the color values are converted to a particular color space, the color values are further processed via subsampling, such as chroma subsampling. When subsampling color values, luma and/or chroma information is averaged over adjacent pixels in order to reduce the bitrate of the processed images. Typically, the chroma components of the image are subsampled while retaining the original resolution of the luma components, since the human visual system is able to detect differences in luminance more readily than differences in color. Accordingly, as shown in FIG. 3, color values specified in a Y'CbCr 4:4:4 format may be subsampled to generate Y'CbCr 4:2:2 values or Y'CbCr 4:2:0 values. The resulting color values are then optionally compressed via a codec, such as HEVC, H.264, etc.

As noted above, one drawback of these conventional HDR conversion processes is that reconstructing the sub-sampled color values can produce artifacts. Notably, although applying an inverse of the color space transform and an inverse of the nonlinear transfer function (e.g., an EOTF PQ) to the Y'CbCr 4:4:4 color values would result in reconstructed color values that are substantially the same as the original linear RGB signal, when subsampling is applied to the Y'CbCr 4:4:4 color values, the chroma values are effectively averaged. Consequently, when these downsampled chroma values are upsampled back to Y'CbCr 4:4:4 color values and the inverse of the nonlinear transfer function is applied to the upsampled values, the reconstructed color values may be significantly different than the color values present in the original linear RGB signal. Such artifacts are particularly noticeable in saturated colors, when one or more of color components (e.g. R, G, and/or B) have values close to zero, where small variations in a particular component value (e.g., R, G, or B) can result in significantly different Y', Cb, and Cr component values, despite each of the linear light RGB values being similar. An example of such artifacts are shown in FIGS. 4B and 5B, each of which includes detail that was not present in the original images, shown in FIGS. 4A and 5A.

Accordingly, in various embodiments, in order to reduce the occurrence and/or visibility of artifacts, the color conversion application 112 adjusts one or more of the downsampled component values such that the values, when upsampled and reconstructed, produce color values that are similar to the color values present in the original HDR content. More specifically, the color conversion application 112 downsamples chroma values. In some embodiments, the color conversion application 112 can obtain downsampled chroma directly from Y'CbCr 4:4:4 color values, as shown in FIG. 3. Alternatively, the color conversion application 112 may downsample the linear RGB color values directly and then apply the OETF PQ and color transform to the downsampled values.

After obtaining the downsampled chroma, the color conversion application 112 upsamples the chroma by applying a selected upsampling filter. The color conversion application 112 then modifies one or more of the Y', Cb, and Cr values such that reconstructing these values to a linear RGB signal produces color values similar to the color values present in the original linear RGB signal. For reference, an example of an EOTF PQ that may be used to reconstruct linear RGB values from nonlinear R'G'B' values is shown below in Equation 2.

$$PQ\_TF(L) = \left(\frac{c_1 + c_2 L^{m_1}}{1 + c_3 L^{m_1}}\right)^{m_2}; m_1 = 0.1593017578125, \quad (2)$$

$$m_2 = 78.84375, c_1 = 0.8359375, c_2 = 18.8515625,$$

$$c_3 = 18.6875.$$

In some embodiments, the color conversion application 112 modifies the Y', Cb, and Cr values by estimating each of the Y', Cb, and Cr values simultaneously. In other embodiments, in order to obtain a faster estimation, the value of Y' may be obtained while keeping the values of Cb and Cr constant. This latter approach may be beneficial because the filter used to upsample the chroma components is not defined by a standard and, thus, may vary across different hardware and software platforms. Moreover, depending on which upsampling filter is used, modifying a chroma sample may also change the upsampled chroma values at neighboring locations.

Accordingly, in various embodiments, the color conversion application 112 determines a value of the luma component Y'(x, y) by finding new Y', Cb, and Cr component values which correspond to $RGB_{new}(x,y)$ values that are substantially similar to the original $RGB_{org}(x, y)$ values. In this notation, x and y are horizontal and vertical positions of the sample, respectively.

Example 1—First Cost Function

In some embodiments, the distance (D) between $RGB_{new}(x,y)$ and $RGB_{org}(x, y)$ could be measured as the Euclidean norm (e.g., the squared error for each component):

$$D=(R_{new}(x,y)-R_{org}(x,y))^2+(G_{new}(x,y)-G_{org}(x,y))^2+ (B_{new}(x,y)-B_{org}(x,y))^2 \quad (3)$$

Omitting sample coordinates for simpler notation, the cost function is as follows:

$$D=(R_{new}-R_{org})^2(G_{new}-G_{org})^2(B_{new}-B_{org})^2 \quad (4)$$

In a more general case, we can also weight the importance of each color component R, G and B with a weighting factor $w_X$, where X corresponds to a color component, $w_R$, $w_G$, and $w_B$. Then, our cost function would take a form of Equation 5 or Equation 6, where f is the EOTF function, such as the ST.2084 EOTF PQ:

$$D=w_R(R_{new}-R_{org})^2 w_G(G_{new}-G_{org})^2 w_B(B_{new}-B_{org})^2 \quad (5)$$

$$D=w_R(f(R'_{new})-f(R'_{org}))^2+w_G(f(G'_{new})-f(G'_{org}))^2+w_B(f(B'_{new})-f(B'_{org}))^2 \quad (6)$$

The values R', G' and B' can be obtained from the original Y'CbCr values by applying an inverse color transform, which depends on the color space associated with the Y'CbCr values. For example, an inverse color transform for Y'CbCr values within the BT.709 and BT.2020 color spaces has the following form:

$$\begin{pmatrix} R' \\ G' \\ B' \end{pmatrix} = \begin{pmatrix} a_{1,1} & a_{1,2} & a_{1,3} \\ a_{2,1} & a_{2,2} & a_{2,3} \\ a_{3,1} & a_{3,2} & a_{3,3} \end{pmatrix} \begin{pmatrix} Y' \\ Cb \\ Cr \end{pmatrix} \quad (7)$$

Attempting to minimize the cost function D for an EOTF with a complex expression, such as ST.2084, requires significant processing resources. Consequently, the EOTF may be approximated using a truncated Taylor series (e.g., the first, second, or third degree polynomials), enabling the cost function D to be minimized via a closed form solution. Two examples of closed form solutions for minimizing the cost function D shown in Equations 3-6 are described below in conjunctions with Equations 8-17. Notably, although the techniques described below implement RGB values, color spaces other than RGB can also be used.

Linear Approximation of EOTF (First Cost Function)

In order to obtain a closed form, one-step solution for estimating a better luma component Y'(x, y) that corresponds to $RGB_{new}(x,y)$ values that are substantially similar to the original $RGB_{org}(x, y)$ values, the EOTF f(X) could be approximated with a first degree polynomial, where the f'($X_i$) is the value of the derivative of the f(X') with respect to X at point $X_i$:

$$f(X_i+\Delta)=f(X_i)+f'(X_i)\Delta \qquad (8)$$

Then, by substituting the EOTF approximation of Equation 8 into Equation 6, the cost function could be approximated as:

$$D=w_R(f'(R'_{org})\Delta_R)^2+w_G(f'(G'_{org})\Delta_G)^2+w_B(f'(B'_{org})\Delta_B)^2 \qquad (9)$$

Next, $\Delta_R$ in Equation 9 is substituted with $(a_{1,1}Y'_{new}+e_R)$—based on the inverse color transform—and similar substitutions are made for $\Delta_G$ and $\Delta_B$. The cost function D is then differentiated with respect to Y' to find a closed form solution for the local minimum. This closed form solution for the value of Y' can be obtained as follows. First, we calculate $e_R$, $e_G$, and $e_B$ based on the new chroma values, the original chroma values, and the inverse color transform parameters:

$$e_R=-Y'_{org}a_{1,1}+(Cb_{new}-Cb_{org})a_{1,2}+(Cr_{new}-Cr_{org})a_{1,3}$$

$$e_G=-Y'_{org}a_{2,1}+(Cb_{new}-Cb_{org})a_{2,2}+(Cr_{new}-Cr_{org})a_{2,3}$$

$$e_B=-Y'_{org}a_{3,1}+(Cb_{new}-Cb_{org})a_{3,2}+(Cr_{new}-Cr_{org})a_{3,3}, \qquad (10)$$

The value of Y' is then equal to:

$$Y'_{new}=-\frac{w_Rf'(R'_{org})^2e_Ra_{1,1}+w_Gf'(G'_{org})^2e_Ga_{2,1}+w_Bf'(B'_{org})^2e_Ba_{3,1}}{w_Rf'(R'_{org})^2a_{1,1}^2+w_Gf'(G'_{org})^2a_{2,1}^2+w_Bf'(B'_{org})^2a_{3,1}^2} \qquad (11)$$

When $a_{1,1}=a_{2,1}=a_{3,1}=1$, as in BT.709 and BT.2020, the expression simplifies to:

$$Y'_{new}=-\frac{w_Rf'(R'_{org})^2e_R+w_Gf'(G'_{org})^2e_G+w_Bf'(B'_{org})^2e_B}{w_Rf'(R'_{org})^2+w_Gf'(G'_{org})^2+w_Bf'(B'_{org})^2} \qquad (12)$$

Further, if all of the weights are set equal to 1, then Y' can be found as follows:

$$Y'_{new}=-\frac{f'(R'_{org})^2e_R+f'(G'_{org})^2e_G+f'(B'_{org})^2e_B}{f'(R'_{org})^2+f'(G'_{org})^2+f'(B'_{org})^2} \qquad (13)$$

In some embodiments, values of the EOTF derivative squared $f'(X)^2$ can be pre-computed and stored in a look-up table. In particular, for a video with bit depth of 10, a look-up table with 1024 entries could be used when the fixed point processing of 10 bits is used. In case of a higher fixed point or floating point precision, more table entries could be used to improve accuracy.

Second Degree Approximation of EOTF (First Cost Function)

Alternatively, the EOTF could be approximated using a second degree polynomial, as shown in Equation 14:

$$f(X_i+\Delta)=f(X_i)+f'(X_i)\Delta+f''(X_i)\Delta^2/2 \qquad (14)$$

The resulting approximation is closer to the real EOTF than a linear approximation. However, finding local minima of the cost function D requires finding roots of a cubic equation, which involves more complexity and processing resources as compared to the linear approximation discussed above.

With respect to the second degree approximation, the derivations may be performed in a similar manner to the linear approximation and are omitted for brevity. The solution, assuming $a_{1,1}=a_{2,1}=a_{3,1}=1$, is as follows:

$$e_R=-Y'_{org}(Cb_{new}-Cb_{org})a_{1,2}+(Cr_{new}-Cr_{org})a_{1,3},$$

$$e_G=-Y'_{org}(Cb_{new}-Cb_{org})a_{2,2}+(Cr_{new}-Cr_{org})a_{2,3},$$

$$e_B=-Y'_{org}(Cb_{new}-Cb_{org})a_{3,2}+(Cr_{new}-Cr_{org})a_{3,3} \qquad (15)$$

Then:

$$T_{3,X}=f''(X)^2,$$

$$T_{2,X}=3f'(X)f''(X)+3f''(X)^2e_X,$$

$$T_{1,X}=2f'(X)^2+6f'(X)f''(X)e_X+3f''(X)^2(e_X)^2,$$

$$T_{0,X}=2f'(X)^2e_X+3f'(X)f''(X)(e_X)^2+f''(X)^2(e_X)^3, \qquad (16)$$

where X stands for R, G, and B, and f'(X) stands for the first derivative f'($R'_{org}$), f'($G'_{org}$), or f'($B'_{org}$), and f''(X) stands for the second derivative f''($R'_{org}$), f''($G'_{org}$), or f''($B'_{org}$). The derivatives are taken with respect to the corresponding non-linear color component.

In order to minimize the cost function D, the cubic equation below is solved with respect to $Y'_{new}$:

$$(w_RT_{3,R}+w_GT_{3,G}+w_BT_{3,B})(Y_{new})^3+(w_RT_{2,R}+w_GT_{2,G}+w_BT_{2,B})(Y_{new})^2+(w_RT_{1,R}+w_GT_{1,G}+w_BT_{1,B})Y_{new}+(w_RT_{0,R}+w_GT_{0,G}+w_BT_{0,B})=0 \qquad (17)$$

The cubic equation has either one or three real roots. In the case of three real roots, the minimum is achieved in either the root having the largest value or the smallest value, due to the fact that the cost function D is quadratic with a positive coefficient at the fourth degree term. The values of the cost function D are then calculated for both roots, and the root resulting in a smaller value is chosen as $Y'_{new}$.

If Equation 3 has only one real root, then the real part of the two complex roots may still be considered as a possible solution. Specifically, because an approximation of an EOTF is used, small changes in values of the equation terms can result in Equation 17 having only one real root instead of three real roots. However, in some cases, when two real roots—one of which would result in the cost function minimum—become two complex roots, the real part of the pair of complex roots represents a better approximation of the solution than the value of the remaining real root.

Example 2—Second Cost Function

In some embodiments, the distance (D) could be measured as a sum of weighted differences between individual R, G, and B components of $RGB_{new}(x,y)$ and $RGB_{org}(x, y)$. In such embodiments, the difference between the two values could be calculated according to Equation 18, where $w_R$, $w_G$, and $w_B$ are the weights corresponding to each color component R, G, and B.

$$D=w_R(R_{new}(x,y)-R_{org}(x,y))+w_G(G_{new}(x,y)-G_{org}(x,y))+w_B(B_{new}(x,y)-B_{org}(x,y)) \qquad (18)$$

Then, after omitting pixel coordinates for a simpler notation, the cost function is defined by Equation 19 or Equation 20, where f(X) is the EOTF function:

$$D = w_R R_{new} - R_{org}) + w_G(G_{new} - G_{org}) + w_B(B_{new} - B_{org}) \quad (19)$$

$$D = w_R(f(R'_{new}) - f(R'_{org})) + w_G(f(G'_{new}) - f(G'_{org})) + w_B(f(B'_{new}) - f(B'_{org})) \quad (20)$$

As noted above, the transfer function domain values R', G', and B' can then be obtained from Y'CbCr by applying an inverse color transform, such as the BT.709 and BT.2020 transform:

$$\begin{pmatrix} R' \\ G' \\ B' \end{pmatrix} = \begin{pmatrix} a_{1,1} & a_{1,2} & a_{1,3} \\ a_{2,1} & a_{2,2} & a_{2,3} \\ a_{3,1} & a_{3,2} & a_{3,3} \end{pmatrix} \begin{pmatrix} Y' \\ Cb \\ Cr \end{pmatrix} \quad (21)$$

In various embodiments, the absolute value of the cost function D (i.e., |D|) shown in Equations 18-20 may be minimized in order to minimize the difference between $RGB_{new}(x,y)$ and $RGB_{org}(x,y)$. However, minimizing the absolute value of D is a non-trivial task, since the absolute value function is not differentiable at 0. Accordingly, in some embodiments, the function $D^2$ is instead minimized, since |D| and $D^2$ reach the minimum at the same point, and the function $D^2$ is differentiable on the entire range of real numbers R. Therefore, the optimization is instead performed for function $D_1$:

$$D_1 = (w_R(f(R'_{new}) - f(R'_{org})) + w_G(f(G'_{new}) - f(G'_{org})) + w_B(f(B'_{new}) - f(B'_{org})))_2 \quad (22)$$

Next, the EOTF is approximated with a truncated Taylor series in order to find a closed form solution to minimizing the cost function $D_1$.

Linear Approximation of EOTF (Second Cost Function)

Substituting (8) into (22), the cost function can be approximated as follows:

$$D = (w_R f'(R'_{org}) \Delta_R + w_G f'(G'_{org}) \Delta_G + w_B f'(B'_{org}) \Delta_B)^2 \quad (23)$$

Then, $\Delta_R$ in Equation 23 is substituted with $(a_{1,1} Y'_{new} + e_R)$ and similar substitutions are made for $\Delta_G$ and $\Delta_B$. The cost function D is then differentiated with respect to Y' to find a closed form solution for the local minimum. To find a closed form solution for the value of Y', we first calculate $e_R$, $e_G$, and $e_B$ according to Equation 10. The value of Y' is equal to:

$$Y'_{new} = -\frac{w_R f'(R'_{org})e_R + w_G f'(G'_{org})e_G + w_B f'(B'_{org})e_B}{w_R f'(R'_{org})a_{1,1} + w_G f'(G'_{org})a_{2,1} + w_B f'(B'_{org})a_{3,1}} \quad (24)$$

When $a_{1,1} = a_{2,1} = a_{3,1} = 1$, as in BT.709 and BT.2020, the expression simplifies to:

$$Y'_{new} = -\frac{w_R f'(R'_{org})e_R + w_G f'(G'_{org})e_G + w_B f'(B'_{org})e_B}{w_R f'(R'_{org}) + w_G f'(G'_{org}) + w_B f'(B'_{org})} \quad (25)$$

In some embodiments, values of the EOTF derivative f'(X) can be pre-computed and stored in a look-up table (e.g., a table having 1024 entries for video with a bit depth of 10 when the fixed point processing of 10 bits is used). In case of a higher fixed point or floating point precision, more table entries could be used to improve accuracy.

Second Degree Approximation of EOTF (Second Cost Function)

Alternatively, the EOTF could be approximated using a second degree polynomial, as shown in Equation 14. Then, the solution, assuming $a_{1,1} = a_{2,1} = a_{3,1} = 1$, is as follows:

$$e_R = -Y'_{org}(Cb_{new} - Cb_{org})a_{1,2} + (Cr_{new} - Cr_{org})a_{1,3},$$

$$e_G = -Y'_{org} + (Cb_{new} - Cb_{org})a_{2,2} + (Cr_{new} - Cr_{org})a_{2,3},$$

$$e_B = -Y'_{org} + (Cb_{new} - Cb_{org})a_{3,2} + (Cr_{new} - Cr_{org})a_{3,3} \quad (26)$$

Then:

$$a = w_R f'(R'_{org}) + W_G f'(G'_{org}) + w_B f'(B'_{org}),$$

$$c = e_R w_R f'(R'_{org}) + e_G w_G f'(G'_{org}) + e_B w_B f'(B'_{org}),$$

$$m_2 = w_R f''(R'_{org}) + w_G f''(G'_{org}) + w_B f''(B'_{org})$$

$$m_1 = a + e_R w_R f''(R'_{org}) + e_G w_G f''(G'_{org}) + e_B w_B f''(B'_{org})$$

$$m_0 = 2c + (e_R)^2 w_R f''(R'_{org}) + (e_G)^2 w_G f''(G'_{org}) + (e_B)^2 w_B f''(B'_{org}), \quad (27)$$

where X stands for R, G, and B, and f'(X) stands for the first derivative $f'(R'_{org})$, $f'(G'_{org})$, or $f'(B'_{org})$, and f''(X) stands for the second derivative $f''(R'_{org})$, $f''(G'_{org})$, or $f''(B'_{org})$.

In order to minimize the cost function D, the cubic equation below is solved with respect to $Y'_{new}$:

$$(m_2)^2 (Y_{new})^3 + 3 m_2 m_1 (Y_{new})^2 + (2(m_1)^2 + m_2 m_0) Y_{new} + (m_0 n_0) = 0 \quad (28)$$

As discussed above, the cubic equation has either one or three real roots. If three real roots are determined, then the minimum is achieved in either the root having the largest value or the smallest value. The values of cost function D are then calculated for both real roots, and the real root resulting in a smaller value is chosen as $Y'_{new}$. In case Equation 28 has only one real root, the real part of the remaining complex roots may be considered as a solution.

In other embodiments, any of the techniques described above can be implemented with other types of transfer functions, including ST.2084 or BT.1886. Additionally, the techniques described above can be applied to other color spaces, such as BT.709 and BT.2020. Further, in some embodiments, the derivative of an EOTF can be obtained either by differentiating the EOTF or by numerically approximating the EOTF, for example, using the definition of a derivative (e.g., dividing a change in the value of the EOTF by a change in the EOTF argument). An average or a weighted average of two or more of EOTF could also be implemented in the closed form solutions—instead of a single EOTF—in order to optimize the approach for compatibility with several transfer functions. In such embodiments, the derivatives of the EOTFs could be replaced with an average or a weighted average (e.g., a weighted sum) of the derivatives of the EOTFs.

The techniques described herein could also use higher order polynomials to approximate an EOTF. In addition, in some embodiments, the cost function D could be minimized with respect to several values (e.g., Y', Cb, and Cr), such as several values that correspond to neighboring pixels. In such embodiments, partial derivatives could be taken with respect to each Y', Cb, and Cr component to find the optimal values of Y', Cb, and Cr.

In various embodiments, the weights $w_R$, $w_G$, and $w_B$ could be chosen based on the desired precision or importance of each color component. For example, the weights could be set equal to 1. In some embodiments, the weights $w_R$, $w_G$, and $w_B$ are chosen on a picture basis or a sequence basis. The weights $w_R$, $w_G$ and $w_B$ could also be set adaptively on a sample/pixel basis, for example, based on the original R, G, and B values for each sample (e.g., based on an inverse relationship with the intensity of R, G, and B for each sample) or based on some other algorithm. In other embodiments, the weights could be set based on the contribution of each color component to the luminance. For example, the weights could be set equal to the contributions of the R, G, and B, components, respectively, to the Y component of the XYZ color space. In the case of BT.709, weights of 0.212639, 0.715169, and 0.072192 could be assigned to $w_R$, $w_G$, and $w_B$, respectively. In the case of BT.2020, weights of 0.262700, 0.677998, and 0.059302 could be assigned to $w_R$, $w_G$, and $w_B$, respectively.

Figure 6:
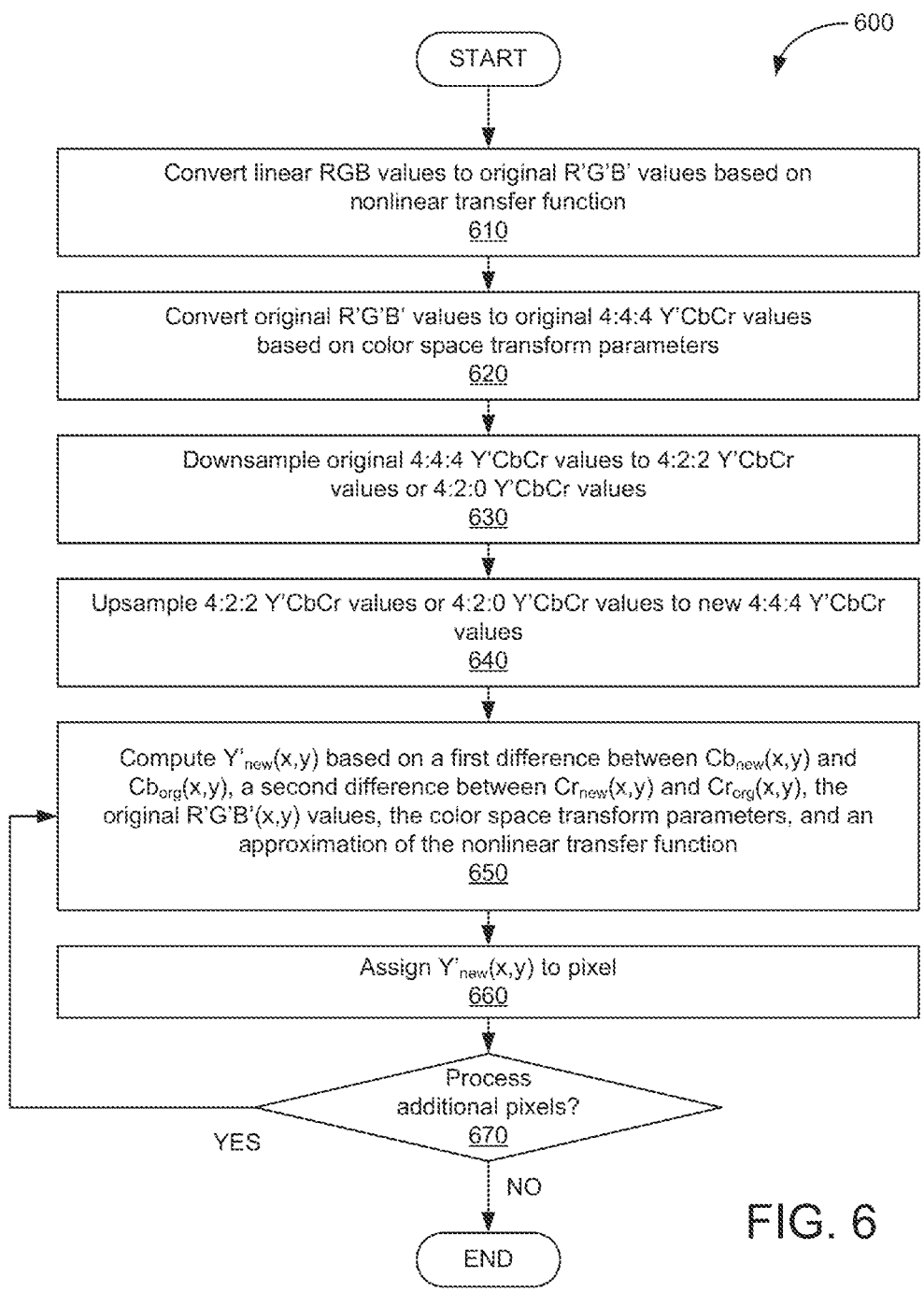
FIG. 6 illustrates a flow diagram of method steps for performing HDR color conversion correction on an image, according to various embodiments of the present invention.

FIG. 6 illustrates a flow diagram of method steps for performing HDR color conversion correction on an image, according to various embodiments of the present invention. Although the method steps are described in conjunction with the systems of FIGS. 1-3, persons skilled in the art will understand that any system configured to perform the method steps, in any order, falls within the scope of the present invention.

As shown in FIG. 6, a method 600 begins at step 610, where the color conversion application 112 converts one or more linear RGB values to $R'G'B'_{org}(x,y)$ values based on a nonlinear transfer function (e.g., an OETF PQ). Next, at step 620, the color conversion application 112 converts the $R'G'B'_{org}(x,y)$ values to $Y'CbCr_{org}$ 4:4:4 values based on transform parameters associated with a target colored space. The color conversion application 112 then subsamples the $Y'CbCr_{org}$ 4:4:4 values to generate $Y'CbCr_{new}$ 4:2:2 values or $Y'CbCr_{new}$ 4:2:0 values.

At step 640, the color conversion application 112 upsamples the Y'CbCr 4:2:2 values or the $Y'CbCr_{org}$ 4:2:0 values to generate $Y'CbCr_{new}$ 4:4:4 values. Then, at step 650, the color conversion application 112 calculates a luma value $Y'_{new}(x,y)$ based on a closed form equation derived from an approximation of an EOTF. In various embodiments, the color conversion application 112 could calculate the luma value $Y'_{new}(x,y)$ based on any of Equations 11-13, 17, 24, 25, and/or 28. For example, the color conversion application 112 could calculate $Y'_{new}(x,y)$ based on the $R'G'B'_{org}(x,y)$ values, the $Y'CbCr_{org}(x,y)$ values, the $Y'CbCr_{new}(x,y)$ values, one or more color space transform parameters, and/or an approximation of a nonlinear transfer function, in accordance with one or more of Equations 11-13, 17, 24, 25, and/or 28.

Then, at step 660, the color conversion application 112 assigns $Y'_{new}(x,y)$ to the corresponding pixel (x,y). At step 670, the color conversion application 112 determines whether $Y'_{new}$ should be determined for one or more additional pixels. If additional pixels are to be processed, then the method 600 returns to step 650, where the color conversion application 112 calculate one or more additional luma values $Y'_{new}$, for example, based on the $R'G'B'_{org}$ values, the $Y'CbCr_{org}$ values, the $Y'CbCr_{new}$ values, one or more color space transform parameters, and/or an approximation of a nonlinear transfer function. The method 600 then terminates.

Although the method 600 is described with respect to specific types of color values, color space parameters, transfer functions, and approximations, the color conversion application 112 may use any type of color values, color space parameters, transfer functions, and approximations to modify Y', Cb, and/or Cr values.

Experimental Results and Computational Complexity

As discussed above, the complexity of the linear approximation approach is significantly lower than that of the conventional luma micro-grading approach. The techniques described herein use a closed form solution to find the value of in a single iteration. By contrast, the conventional micro-grading approach requires 10 iterations for a 10-bit video, including the last two boxes in the chain in FIG. 2—obtaining the R'G'B' values, applying the EOTF, and calculating the linear light luminance. Therefore, the proposed linear approximation approach has a good complexity versus quality trade-off that makes this approach well suited for real-time systems.

The algorithms described above were compared to conventional techniques that implement a luma micro-grading algorithm. Each of the algorithms was run on sequences FireEater (shown in FIGS. 4A-4C), Market (shown in FIGS. 5A-5C), and Tibul in a BT.709 container. Each sequence was 1920×1080p with a peak luminance of 4000 cd/m². In each simulation, [−2 16 54 −4]/64 and [−4 36 36 −4]/64 filters were used for vertical and horizontal upsampling, respectively. Other upsampling and downsampling filters could alternatively be used in the algorithm.

FIGS. 4A-4C and 5A-5C demonstrate the effect of the linear approximation algorithm, with weights $w_R$, $w_G$, and $w_B$ equal to the coefficients of the contribution of the R, G, and B components, respectively, to the Y component of the XYZ color space. In the case of BT.709, the weights could be 0.212639, 0.715169, and 0.072192 for $w_R$, $w_G$, and $w_B$, respectively. In the case of BT.2020, the weights could be 0.262700, 0.677998, and 0.059302 for $w_R$, $w_G$, and $w_B$, respectively.

Figure 4C:
Figure 4B:
Figure 4A:

As shown in FIGS. 4C and 5C, the image resulting from the closed form solution based on a linear approximation of the EOTF is more accurate relative to the original image than the image generated via conventional chroma downsampling.

Objective results are provided in Tables 1-4 below. The values in the Tables 1-4 represent PSNR in the linear light domain and tPSNR. tPSNR involves transforming the RGB color space to the XYZ color space, averaging the output of two transfer functions, PQ (ST.2084) and Philips, and then calculating PSNR in X, Y, and Z components.

As observed from the results in Tables 1-4, the average PSNR is increased by more than 1.75 dB compared to conventional chroma downsampling. Additionally, a 3.65 dB improvement is seen in tPSNR when implementing a linear approximation of EOTF. As compared to the slower, conventional luma micro-grading approach, the various embodiments disclosed herein yield a 0.07 dB lower average PSNR when implementing a linear approximation of the EOTF and a 0.01 dB higher average PSNR for the second degree polynomial approximation of the EOTF. The tPSNR metric is 0.17 dB lower than the conventional luma micro-grading approach, on average. In addition, the second degree approximation method results in a slightly better PSNR and tPSNR measures than the linear approximation.

Notably, each of the techniques disclosed herein significantly improve the subjective quality of the tested videos, removing perceptual artifacts. Another observation is that the techniques disclosed herein produce smoother luma than the conventional chroma downsampling, likely resulting in gains in subsequent compression of the resulting video.

TABLE 1

Direct downsampling of chroma components

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 50.80 | 71.20 | 67.45 | 63.15 | 54.48 | 57.13 | 54.76 | 55.30 |
| Market | 46.35 | 58.59 | 48.98 | 51.31 | 47.22 | 49.31 | 44.59 | 46.61 |
| Tibul | 62.51 | 82.75 | 81.61 | 75.62 | 50.26 | 52.21 | 59.73 | 52.56 |
| Total | 53.22 | 70.85 | 66.01 | 63.36 | 50.65 | 52.88 | 53.03 | 51.49 |

TABLE 2

Results of conventional luma micro-grading

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 57.92 | 68.95 | 66.79 | 64.55 | 64.34 | 70.91 | 53.20 | 57.58 |
| Market | 48.29 | 59.87 | 49.81 | 52.66 | 55.43 | 69.38 | 45.69 | 50.00 |
| Tibul | 71.36 | 82.69 | 80.94 | 78.33 | 62.43 | 66.94 | 54.45 | 58.33 |
| Total | 59.19 | 70.50 | 65.85 | 65.18 | 60.73 | 69.08 | 51.11 | 55.31 |

TABLE 3

Second cost function D and linear approximation of EOTF

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 56.69 | 69.86 | 66.96 | 64.50 | 63.89 | 70.22 | 53.23 | 57.56 |
| Market | 48.17 | 59.71 | 49.71 | 52.53 | 55.37 | 63.93 | 45.59 | 49.87 |
| Tibul | 71.05 | 82.87 | 80.96 | 78.29 | 62.18 | 65.83 | 54.13 | 57.99 |
| Total | 58.64 | 70.81 | 65.88 | 65.11 | 60.48 | 66.66 | 50.98 | 55.14 |

TABLE 4

Second cost function D and second degree approximation of EOTF

| Sequence | PSNR-R | PSNR-G | PSNR-B | PSNR | tPSNR-X | tPSNR-Y | tPSNR-Z | tPSNR-XYZ |
|---|---|---|---|---|---|---|---|---|
| FireEater | 58.05 | 68.71 | 66.74 | 64.50 | 64.31 | 70.33 | 53.17 | 57.54 |
| Market | 48.30 | 59.93 | 49.85 | 52.69 | 55.16 | 64.78 | 45.66 | 49.92 |
| Tibul | 71.39 | 82.67 | 80.94 | 78.33 | 62.55 | 66.74 | 54.39 | 58.29 |
| Total | 59.24 | 70.44 | 65.84 | 65.17 | 60.67 | 67.28 | 51.07 | 55.25 |

In sum, a color conversion application downsamples chroma values and then upsamples the chroma values by applying an upsampling filter. The color conversion application then modifies one or more of the downsampled Y'CbCr values such that the reconstruction of these values to a linear RGB signal produces values similar to those of the original linear RGB signal. In various embodiments, the color conversion application calculates an optimal value of Y', while keeping the values of Cb and Cr constant, by evaluating a closed form solution that is based on an approximation of a nonlinear transfer function.

At least one advantage of the disclosed techniques is that resulting reconstructed HDR images are more accurate relative to the original HDR images than images generated via conventional chroma downsampling. Additionally, the complexity of the disclosed techniques is significantly lower than that of the conventional approaches, enabling an optimal component value (e.g., a luma value) to be determined in real-time via a single iteration.

1. In some embodiments, a non-transitory computer-readable storage medium includes instructions that, when executed by a processor, cause the processor to perform the steps of: downsampling first color space values to generate downsampled color space values; upsampling the downsampled color space values to generate second color space values; and modifying at least one component value included in the downsampled color space values based on a first component value included in the first color space values, a second component value included in the second color space values, and an approximation of a nonlinear transfer function.

2. The non-transitory computer-readable storage medium of clause 1, wherein the at least one component value comprises at least one luma value.

3. The non-transitory computer-readable storage medium of any of clauses 1-2, wherein the approximation of the nonlinear transfer function comprises at least one of a linear approximation of an electro-optical transfer function (EOTF) and a second order approximation of the EOTF.

4. The non-transitory computer-readable storage medium of any of clauses 1-3, wherein the first color space values are generated based on linear color values and the nonlinear transfer function.

5. The non-transitory computer-readable storage medium of any of clauses 1-4, further comprising calculating a first difference between the second component value included in the second color space values and the first component value included in the first color space values, wherein the at least one component value is modified based on the first difference.

6. The non-transitory computer-readable storage medium of any of clauses 1-5, wherein the first component value, the second component value, a third component value included in the first color space values, and a fourth component value included in the second color space values comprise chroma values, and wherein the at least one component value is modified based on the chroma values and a luma value included in the first color space values.

7. The non-transitory computer-readable storage medium of any of clauses 1-6, wherein the first color space values and the second color space values comprise 4:4:4 Y'CbCr values, and the downsampled color space values comprise at least one of 4:2:2 Y'CbCr values and 4:2:0 Y'CbCr values.

8. The non-transitory computer-readable storage medium of any of clauses 1-7, wherein the at least one component value is modified based on a lookup table associated with the approximation of the nonlinear transfer function.

9. The non-transitory computer-readable storage medium of any of clauses 1-8, wherein the at least one component value is modified based on nonlinear color space component values and color space transform parameters, and wherein the first color space values are generated by applying the color space transform parameters to the nonlinear color space component values.

10. The non-transitory computer-readable storage medium of any of clauses 1-9, wherein the at least one component value is modified based on at least one of a first weighting applied to a red color value, a second weighting applied to a green color value, and a third weighting applied to a blue color value.

11. The non-transitory computer-readable storage medium of any of clauses 1-10, wherein the first weighting corresponds to a red contribution to a nonlinear color space luma, the second weighting corresponds to a green contribution to the nonlinear color space luma, and the third weighting corresponds to a blue contribution value associated with the nonlinear color space luma.

12. The non-transitory computer-readable storage medium of any of clauses 1-11, wherein the first weighting corresponds to a red contribution to a linear color space luminance, the second weighting corresponds to a green contribution to the linear color space luminance, and the third weighting corresponds to a blue contribution to the linear color space luminance.

13. In some embodiments, a method comprises: downsampling first color space values to generate downsampled color space values; upsampling the downsampled color space values to generate second color space values; and modifying at least one component value included in the downsampled color space values based on an approximation of a nonlinear transfer function.

14. The method of clause 13, wherein the at least one component value is modified based on a first component value included in the first color space values and a second component value included in the second color space values, and the at least one component value comprises at least one luma value.

15. The method of any of clauses 13-14, further comprising calculating a first difference between the second component value included in the second color space values and the first component value included in the first color space values, wherein the at least one component value is modified based on the first difference.

16. The method of any of clauses 13-15, wherein the first component value, the second component value, a third component value included in the first color space values, and a fourth component value included in the second color space values comprise chroma values, and wherein the at least one component value is modified based on the chroma values and a luma value included in the first color space values.

17. The method of any of clauses 13-16, wherein the first color space values and the second color space values comprise 4:4:4 Y'CbCr values, and the downsampled color space values comprise at least one of 4:2:2 Y'CbCr values and 4:2:0 Y'CbCr values.

18. The method of any of clauses 13-17, wherein the approximation of the nonlinear transfer function comprises at least one of a linear approximation of an electro-optical transfer function (EOTF) and a second order approximation of the EOTF.

19. The method of any of clauses 13-18, wherein the first color space values are generated based on linear color values and the nonlinear transfer function.

20. The method of any of clauses 13-19, wherein the at least one component value is modified based on a lookup table associated with the approximation of the nonlinear transfer function.

21. A computing device, comprises: a memory storing a color correction application; and a processor that is coupled to the memory and, when executing the color correction application, is configured to: downsample first color space values to generate downsampled color space values; upsample the downsampled color space values to generate second color space values; and modify at least one luma value included in the downsampled color space values based on a first chroma value included in the first color space values, a second chroma value included in the second color space values, and an approximation of a nonlinear transfer function.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
   receiving high-definition range (HDR) media content;
   downsampling, by a color conversion application executing on a computer processor, first color space values associated with a given pixel of the HDR media content to generate downsampled color space values associated with the given pixel;
   upsampling, by the color conversion application, the downsampled color space values to generate second color space values associated with the given pixel;
   modifying, by the color conversion application, at least one component value included in the downsampled color space values based on a first component value included in the first color space values, a second component value included in the second color space values, and an approximation of a nonlinear transfer function; and
   generating color-corrected HDR media content based on the modified at least one component value.

2. The non-transitory computer-readable storage medium of claim 1, wherein the at least one component value comprises at least one luma value.

3. The non-transitory computer-readable storage medium of claim 1, wherein the approximation of the nonlinear transfer function comprises at least one of a linear approximation of an electro-optical transfer function (EOTF) and a second order approximation of the EOTF.

4. The non-transitory computer-readable storage medium of claim 1, wherein the first color space values are generated based on linear color values and the nonlinear transfer function.

5. The non-transitory computer-readable storage medium of claim 1, further comprising calculating a first difference between the second component value included in the second color space values and the first component value included in the first color space values, wherein the at least one component value is modified based on the first difference.

6. The non-transitory computer-readable storage medium of claim 1, wherein the first component value, the second component value, a third component value included in the first color space values, and a fourth component value included in the second color space values comprise chroma values, and wherein the at least one component value is modified based on the chroma values and a luma value included in the first color space values.

7. The non-transitory computer-readable storage medium of claim 6, wherein the first color space values and the second color space values comprise 4:4:4 Y'CbCr values, and the downsampled color space values comprise at least one of 4:2:2 Y'CbCr values and 4:2:0 Y'CbCr values.

8. The non-transitory computer-readable storage medium of claim 1, wherein the at least one component value is modified based on a lookup table associated with the approximation of the nonlinear transfer function.

9. The non-transitory computer-readable storage medium of claim 1, wherein the at least one component value is modified based on nonlinear color space component values and color space transform parameters, and wherein the first color space values are generated by applying the color space transform parameters to the nonlinear color space component values.

10. The non-transitory computer-readable storage medium of claim 1, wherein the at least one component value is modified based on at least one of a first weighting applied to a red color value, a second weighting applied to a green color value, and a third weighting applied to a blue color value.

11. The non-transitory computer-readable storage medium of claim 10, wherein the first weighting corresponds to a red contribution to a nonlinear color space luma, the second weighting corresponds to a green contribution to the nonlinear color space luma, and the third weighting corresponds to a blue contribution value associated with the nonlinear color space luma.

12. The non-transitory computer-readable storage medium of claim 10, wherein the first weighting corresponds to a red contribution to a linear color space luminance, the second weighting corresponds to a green contribution to the linear color space luminance, and the third weighting corresponds to a blue contribution to the linear color space luminance.

13. A method, comprising:
receiving high-definition range (HDR) media content;
downsampling, by a color conversion application executing on a computer processor, first color space values associated with a given pixel of the HDR media content to generate downsampled color space values associated with the given pixel;
upsampling, by the color conversion application, the downsampled color space values to generate second color space values associated with the given pixel;
modifying, by the color conversion application, at least one component value included in the downsampled color space values based on a first component value included in the first color space values, a second component value included in the second color space values, and an approximation of a nonlinear transfer function; and
generating color-corrected HDR media content based on the modified at least one component value.

14. The method of claim 13, wherein the at least one component value is modified based on a first component value included in the first color space values and a second component value included in the second color space values, and the at least one component value comprises at least one luma value.

15. The method of claim 14, further comprising calculating a first difference between the second component value included in the second color space values and the first component value included in the first color space values, wherein the at least one component value is modified based on the first difference.

16. The method of claim 14, wherein the first component value, the second component value, a third component value included in the first color space values, and a fourth component value included in the second color space values comprise chroma values, and wherein the at least one component value is modified based on the chroma values and a luma value included in the first color space values.

17. The method of claim 16, wherein the first color space values and the second color space values comprise 4:4:4 Y'CbCr values, and the downsampled color space values comprise at least one of 4:2:2 Y'CbCr values and 4:2:0 Y'CbCr values.

18. The method of claim 13, wherein the approximation of the nonlinear transfer function comprises at least one of a linear approximation of an electro-optical transfer function (EOTF) and a second order approximation of the EOTF.

19. The method of claim 13, wherein the first color space values are generated based on linear color values and the nonlinear transfer function.

20. The method of claim 13, wherein the at least one component value is modified based on a lookup table associated with the approximation of the nonlinear transfer function.

21. A computing device, comprising:
a memory storing a color correction application; and
a processor that is coupled to the memory and, when executing the color correction application, is configured to:
receive high-definition range (HDR) media content;
downsample first color space values associated with a given pixel of the HDR media content to generate downsampled color space values associated with the given pixel;
upsample the downsampled color space values to generate second color space values;
modify at least one luma value included in the downsampled color space values based on a first chroma value included in the first color space values, a second chroma value included in the second color space values, and an approximation of a nonlinear transfer function; and
generate color-corrected HDR media content based on the modified at least one component value.

* * * * *